(12) United States Patent
Hsieh et al.

(10) Patent No.: US 9,098,994 B2
(45) Date of Patent: Aug. 4, 2015

(54) ELECTRIC METER NETWORK SYSTEM, ELECTRIC METER NODE AND BROADCASTING METHOD THEREOF

(71) Applicant: Institute For Information Industry, Taipei (TW)

(72) Inventors: Chih-Chiang Hsieh, Taipei (TW); Hsiang-Chin Hsieh, New Taipei (TW); Tien-Yi Sun, Taichung (TW); Emery Jou, Taipei (TW)

(73) Assignee: Institute For Information Industry, Taipei (TW)

( * ) Notice: Subject to any disclaimer, the term of this patent is extended or adjusted under 35 U.S.C. 154(b) by 362 days.

(21) Appl. No.: 13/778,401

(22) Filed: Feb. 27, 2013

(65) Prior Publication Data

US 2014/0139351 A1    May 22, 2014

(30) Foreign Application Priority Data

Nov. 21, 2012    (TW) .............................. 101143565 A

(51) Int. Cl.
| | |
|---|---|
| *G08B 23/00* | (2006.01) |
| *G08C 15/06* | (2006.01) |
| *G01D 4/00* | (2006.01) |
| *G01D 21/00* | (2006.01) |

(52) U.S. Cl.
CPC ............... *G08C 15/06* (2013.01); *G01D 4/002* (2013.01); *G01D 4/004* (2013.01); *G01D 4/006* (2013.01); *G01D 21/00* (2013.01)

(58) Field of Classification Search
CPC ......... G01D 4/002; G01D 4/004; H04Q 9/00; H04Q 2209/60; H04Q 2209/40; H04Q 2209/43; H04Q 2209/823; H04Q 2209/886; H04Q 2209/20; H04Q 2209/25; H04Q 2209/30; H04Q 2209/47; H04Q 2209/75; H04Q 2209/80; H04Q 2209/82; H04Q 2209/08
USPC .............. 340/870.02; 370/338, 235, 316, 310
See application file for complete search history.

(56) References Cited

U.S. PATENT DOCUMENTS

| | | | | |
|---|---|---|---|---|
| 5,673,252 | A * | 9/1997 | Johnson et al. ............... | 370/449 |
| 6,147,967 | A * | 11/2000 | Ying et al. .................... | 370/222 |
| 6,985,836 | B2 * | 1/2006 | Cremers et al. .................. | 703/2 |
| 2002/0035456 | A1 * | 3/2002 | Cremers et al. .................. | 703/5 |
| 2006/0056331 | A1 * | 3/2006 | Ratiu et al. .................... | 370/316 |
| 2006/0056363 | A1 * | 3/2006 | Ratiu et al. .................... | 370/338 |
| 2006/0056368 | A1 * | 3/2006 | Ratiu et al. .................... | 370/338 |
| 2006/0056423 | A1 * | 3/2006 | Ratiu et al. .................... | 370/401 |

(Continued)

OTHER PUBLICATIONS

Office Action to the corresponding Taiwan Patent Application No. 101143565 rendered by Taiwan Intellectual Property Office (TIPO) on Jul. 8, 2014, 8 pages.

(Continued)

*Primary Examiner* — Jennifer Mehmood
*Assistant Examiner* — Rufus Point
(74) *Attorney, Agent, or Firm* — Skaar Ulbrich Macari, P.A.

(57) ABSTRACT

An electric meter (EM) network system, an EM node and a broadcasting method thereof are provided. The EM node, which is electrically connected to a power supply loop, stores a layer number and a total layer number. When the power supply loop recovers from a power disconnect condition to a power supplying condition, the EM node obtains a waiting time according to a difference value between the layer number and the total layer number, and broadcasts a route message after the waiting time.

22 Claims, 7 Drawing Sheets

(56) References Cited

U.S. PATENT DOCUMENTS

| | | | | |
|---|---|---|---|---|
| 2006/0056456 | A1* | 3/2006 | Ratiu et al. | 370/474 |
| 2008/0112322 | A1* | 5/2008 | Bardalai | 370/235 |
| 2009/0135750 | A1* | 5/2009 | Ratiu et al. | 370/310 |
| 2010/0094600 | A1* | 4/2010 | Smith et al. | 703/2 |
| 2010/0191848 | A1* | 7/2010 | Fujita et al. | 709/224 |

OTHER PUBLICATIONS

L. Cao, W. Jiang, Z. Zhang, Networked wireless meter reading system based on ZigBee technology, IEEE, Chinese Control and Decision Conference (CCDC), pp. 3455-3460, Jul. 2-4, 2008, 6 pages.

* cited by examiner

ELECTRIC METER NETWORK SYSTEM, ELECTRIC METER NODE AND BROADCASTING METHOD THEREOF

PRIORITY

This application claims the benefit of priority based on Taiwan Patent Application No. 101143565 filed on Nov. 21, 2012, which is hereby incorporated by reference in its entirety.

FIELD

The present invention relates to an electric meter (EM) network system, an EM node and a broadcasting method thereof. More particularly, the EM network system of the present invention has a plurality of EM nodes. The EM nodes are electrically connected to a power supply loop and, when the power supply loop recovers from a power disconnect condition to a power supplying condition, broadcast route messages after different waiting times to re-establish data transmission paths.

BACKGROUND

An advanced metering infrastructure (AMI) system usually comprises a smart electric meter (EM) device (hereinafter termed as an EM node), a communication system and an EM data management server to provide users with energy consumption information so that the users can know respective energy consumption conditions and reduce the energy consumption correspondingly. Moreover, the AMI system further has the advantages of supporting the fault detection, the blackout and power recovering management, the remote automatic metering and so on, and this helps to reduce the need for human resources.

In recent years, extensive researches have been made to apply the Ad Hoc On-Demand Distance Vector (AODV) routing protocol to the communication system of the AMI system. However, according to the AODV routing protocol, when a power supply loop of a region recovers from a power disconnect condition to a power supplying condition, all the EM nodes electrically connected to the power supply loop will broadcast respective route messages simultaneously and usually further broadcast route messages received from other EM nodes so as to re-establish data transmission paths. In a network environment with a limited bandwidth, broadcasting massive route messages simultaneously will cause collisions of the route messages and network congestions, which will make the networking speed slower and even disable the whole network.

Accordingly, an urgent need exists in the art to provide a mechanism of broadcasting route messages, which can effectively reduce collisions of the route messages and network congestions caused during re-establishment of data transmission paths when the power supply loop recovers from a power disconnect condition to a power supplying condition.

SUMMARY

An objective of the present invention is to provide an electric meter (EM) network system, an EM node and a broadcasting method thereof. The EM network system of the present invention provides a mechanism of broadcasting route messages according to the AODV routing protocol. When a power supply loop recovers from a power disconnect condition to a power supplying condition, the mechanism of broadcasting route messages of the present invention enables EM nodes to broadcast route messages after different waiting times to re-establish data transmission paths. Thus, collisions of the route messages and network congestions caused during re-establishment of the data transmission paths can be effectively reduced.

To achieve the aforesaid objective, certain embodiments of the present invention disclose an EM network system, which comprises a back-end server, a concentrator, a first EM node and a second EM node. The concentrator is communicatively connected to the back-end server. The first EM node is electrically connected to a power supply loop, and is configured to store a first layer number and a total layer number. When the power supply loop recovers from a power disconnect condition to a power supplying condition, the first EM node obtains a first waiting time according to a first difference value between the first layer number and the total layer number and broadcasts a first route message after the first waiting time. The second EM node is electrically connected to the power supply loop, and is configured to store a second layer number and the total layer number. When the power supply loop recovers from the power disconnect condition to the power supplying condition, the second EM node obtains a second waiting time according to a second difference value between the second layer number and the total layer number and broadcasts a second route message after the second waiting time. The first waiting time is longer than the second waiting time. The first EM node receives the second route message from the second EM node and broadcasts the second route message after the first waiting time. The concentrator receives the first route message and the second route message from the first EM node.

To achieve the aforesaid objective, certain embodiments of the present invention further disclose an EM node, which is electrically connected to a power supply loop and comprises a storage, a transceiver and a processor. The storage is configured to store a layer number and a total layer number. The transceiver is configured to broadcast a route message. The processor is electrically connected to the transceiver and the storage, and is configured to obtain a waiting time according to a difference value between the layer number and the total layer number when the power supply loop recovers from a power disconnect condition to a power supplying condition, and enable the transceiver to broadcast the route message after the waiting time.

To achieve the aforesaid objective, certain embodiments of the present invention further disclose a broadcasting method for an EM node. The EM node is electrically connected to a power supply loop and comprises a storage, a transceiver and a processor. The processor is electrically connected to the storage and the transceiver. The storage is configured to store a layer number and a total layer number. The broadcasting method is executed by the processor and comprises the following steps of: obtaining a waiting time according to a difference value between the layer number and the total layer number when the power supply loop recovers from a power disconnect condition to a power supplying condition; and enabling the transceiver to broadcast a route message after the waiting time.

The detailed technology and preferred embodiments implemented for the subject invention are described in the following paragraphs accompanying the appended drawings for people skilled in this field to well appreciate the features of the claimed invention.

DETAILED DESCRIPTION

The present invention relates to an electric meter (EM) network system, an EM node and a broadcasting method thereof. In the following descriptions, the present invention will be explained with reference to example embodiments thereof. It shall be appreciated that, these example embodiments are not intended to limit the present invention to any specific examples, embodiments, environments, applications or particular implementations described in these embodiments. Therefore, description of these example embodiments is only for purpose of illustration rather than to limit the present invention, and the scope claimed in this application shall be governed by the claims. Besides, in the following embodiments and the attached drawings, elements not directly related to the present invention are omitted from depiction; and dimensional relationships among individual elements in the attached drawings are illustrated only for ease of understanding but not to limit the actual scale.

Figure 1:
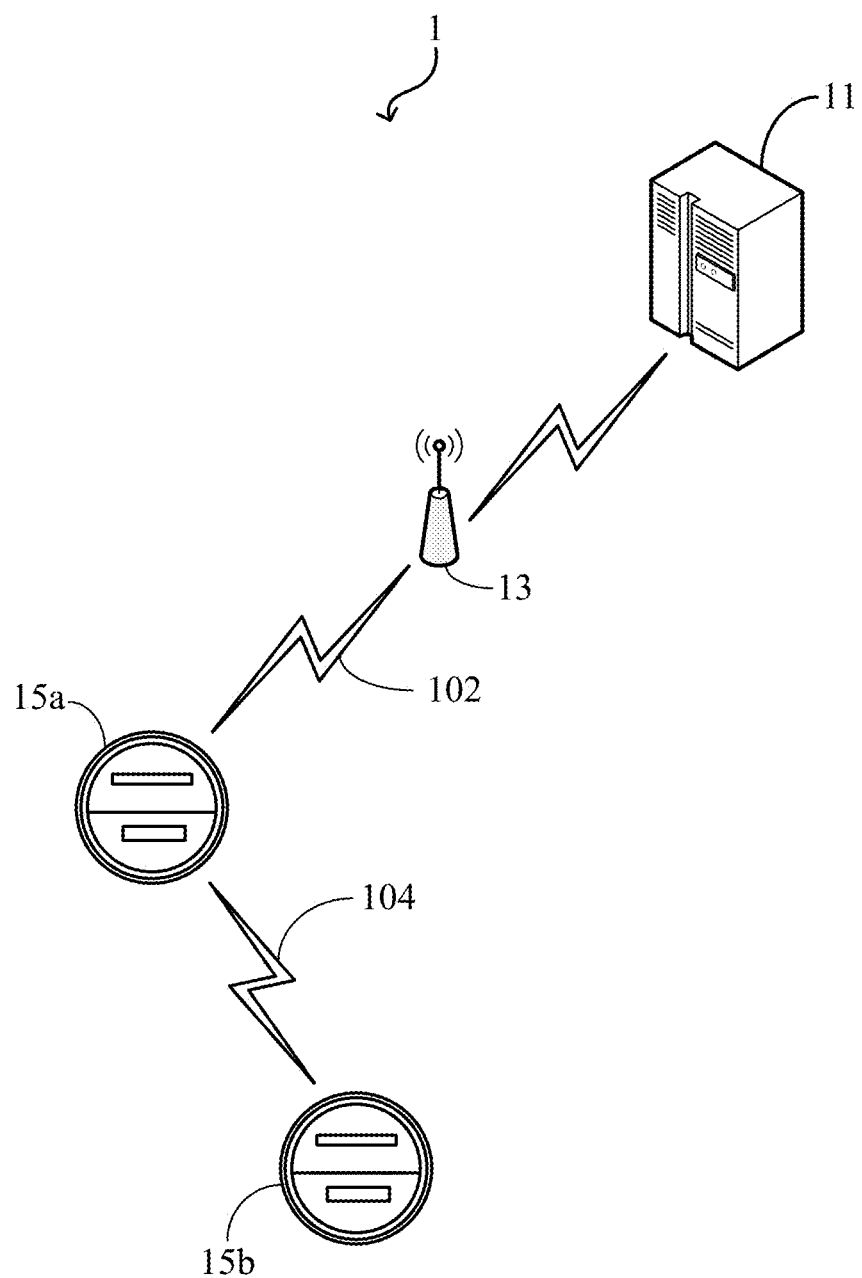
FIG. 1 is a schematic view of an EM network system 1 according to a first embodiment of the present invention.

A first embodiment of the present invention is as shown in FIG. 1, which is a schematic view of an EM network system 1. The EM network system 1 comprises a back-end server 11, a concentrator 13, a first EM node 15a and a second EM node 15b. It shall be appreciated that, in practice, the EM network system 1 may have a plurality of branches, each of which may comprise more than two EM nodes; however, for simplicity of description, only a first EM node 15a and a second EM node 15b in a branch will be illustrated in this embodiment to highlight the primary technical contents of the present invention.

The back-end server 11 is configured to manage a plurality of EM nodes and record information of the EM nodes to provide related consumption information. The back-end server 11, which is communicatively connected to the concentrator 13, is configured to receive the information of the EM nodes from the concentrator 13, and read meter readings of the EM nodes and detect faults of the EM nodes through the concentrator 13. In this embodiment, the first EM node 15a and the second EM node 15b belong to the same branch. The first EM node 15a is closer to the concentrator 13, and message transmissions between the first EM node 15a and the concentrator 13 can be carried out directly while message transmissions between the second EM node 15b and the concentrator 13 must be carried out via the first EM node 15a.

The first EM node 15a and the second EM node 15b are electrically connected to a power supply loop. The power supply loop originates from a power supply cubicle of a region to supply electric power for the region. The present invention mainly focuses on operations of the EM nodes when the power supply loop recovers from a power disconnect condition to a power supplying condition. In other words, the EM network system 1 has previously completed establishment of route paths (data transmission paths) of the overall EM nodes for at least once, and the EM nodes have stored respective layer numbers and a total layer number of the overall EM nodes of the EM network system 1. In this embodiment, the first EM node 15a stores a first layer number (e.g., 1) and a total layer number (e.g., 2). The first layer number which is equal to 1 represents that the first EM node 15a is closest in this branch to the concentrator 13 and message transmissions between the first EM node 15a and the concentrator 13 can be carried out directly without need of any other intermediate EM node. The total layer number which is equal to 2 represents that the EM nodes in this branch can be divided into 2 layers according to route relationships therebetween. Similarly, the second EM node 15b stores a second layer number (e.g., 2) and the total layer number. The second layer number which is equal to 2 represents that message transmissions between the second EM node 15b and the concentrator 13 must be carried out through one EM node (i.e., the EM node 15a) in this branch.

When the power supply loop recovers from a power disconnect condition to a power supplying condition, the first EM node 15a obtains a first waiting time according to a first difference value (e.g., 1) between the first layer number and the total layer number and broadcasts a first route message 102 after the first waiting time. Meanwhile, the second EM node 15b obtains a second waiting time according to a second difference value (e.g., 0) between the second layer number and the total layer number and broadcasts a second route message 104 after the second waiting time. For example, the first waiting time may be equal to the first difference value multiplied by a time interval (e.g., 2 seconds), i.e., equal to 2 seconds; and the second waiting time may be equal to the second difference value multiplied by the same time interval, i.e., equal to 0 second. Because the first waiting time is longer than the second waiting time, the first EM node 15a firstly receives the second route message 104 from the EM node 15b, and broadcasts the second route message 104 together with the first route message 102 simultaneously after the first waiting time.

Then, the concentrator 13 receives the first route message 102 and the second route message 104 from the first EM node 15a. Thus, the route paths between the first EM node 15a, the second EM node 15b and the concentrator 13 have been established, and message transmissions can be carried out between the back-end server 11 and the first EM node 15a as well as the second EM node 15b via the concentrator 13. It shall be appreciated that, the aforesaid time interval can be set according to the actual system performances, e.g., the performance of generating broadcast messages by the EM nodes, the performance of processing the broadcast messages received and signal transmission distances between the EM nodes.

Furthermore, when the total layer number is quite large in practice, an EM node with a layer number of 1 will experience a quite long waiting time so that the whole EM network system 1 must take a quite long time to complete establishment of the route paths. In this case, (a difference value between the layer number of the EM node and the total layer number) mod (a modular divisor)×(a time interval) may be used as a waiting time of the EM node in the present invention. Take the first EM node 15a as an example. When the modular divisor is equal to 2, the first waiting time is equal to 1 (i.e., 1 mod 2). The modular divisor may be adjusted according to the total layer number, and theoretically ranges between 2 and the total layer number. The larger the modular divisor is, the more of collisions of the route messages and network congestions caused during re-establishment of the route paths can be reduced, but this also causes the whole EM network system 1 to take a longer time to complete establishment of the route paths.

Additionally, the EM network system 1 is based on the AODV routing protocol, so an EM node, after receiving a route message broadcast from another EM node, will return an acknowledgement (ACK) message corresponding to the route message to the another EM node; and then, the another EM node will no longer broadcast the route message again after receiving the ACK message. For example, the first EM node 15a returns an ACK message to the second EM node 15b after receiving the second route message 104; and then, the second EM node 15b stops broadcasting the second route message 104 again after receiving the ACK message. Because the technical contents of this part belong to the specification of the AODV routing protocol and are not the primary technical contents of the present invention, they will not be further described herein.

Figure 2:
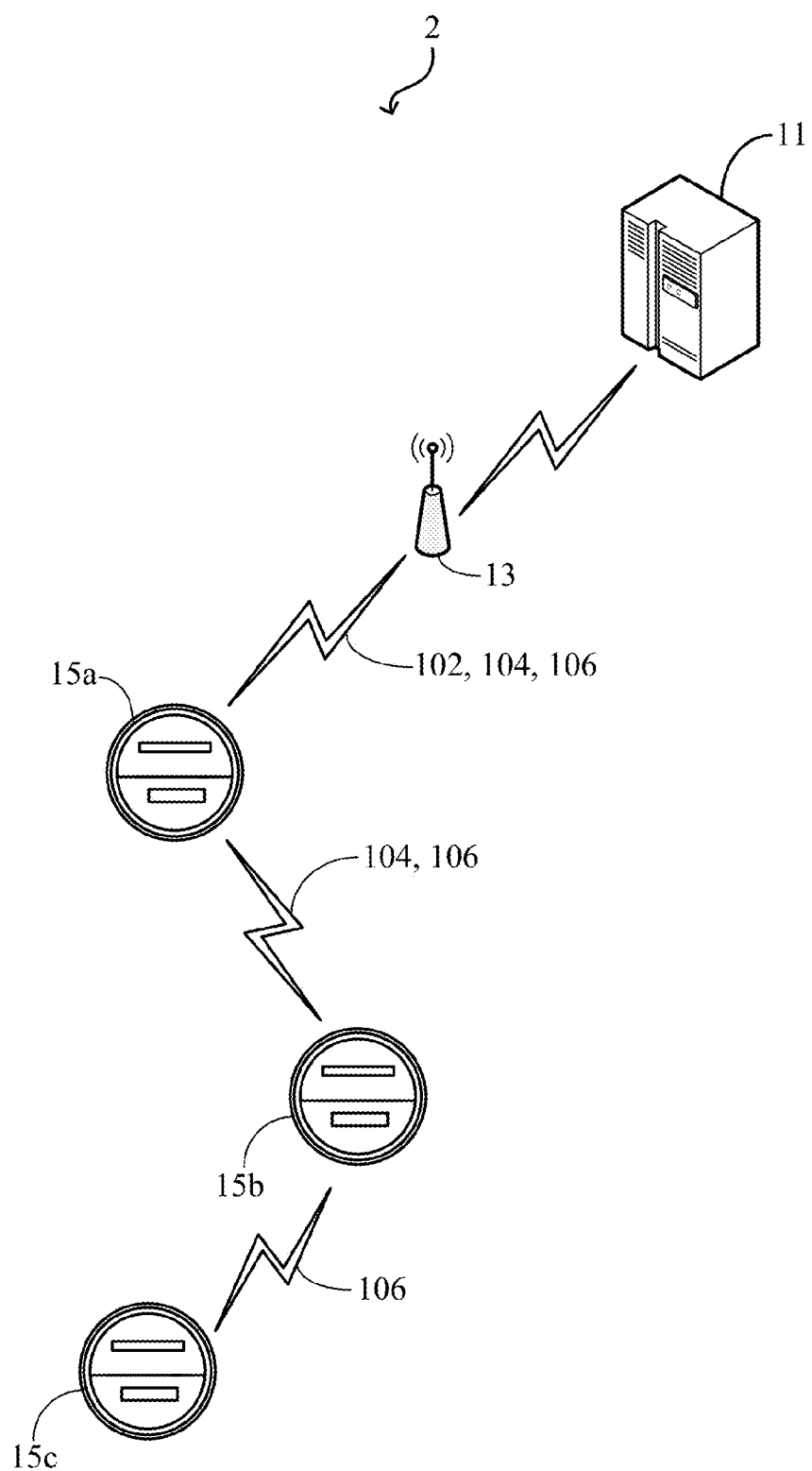
FIG. 2 is a schematic view of an EM network system 2 according to a second embodiment of the present invention.

A second embodiment of the present invention is as shown in FIG. 2, which is a schematic view of an EM network system 2. Different from the EM network system 1 of the first embodiment, the EM network system 2 of the second embodiment further comprises a third EM node 15c. The third EM node 15c is electrically connected to the same power supply loop and stores a third layer number (e.g., 3) and the total layer number (e.g., 10).

When the power supply loop recovers from the power disconnect condition to the power supplying condition, the third EM node 15c obtains a third waiting time according to a third difference value (e.g., 0) between the third layer number and the total layer number and broadcasts a third route message 106 after the third waiting time. If the third waiting time is equal to the third difference value multiplied by the time interval (e.g., 2 seconds), then the third waiting time is 0 second. Furthermore, because the first difference value is 2 and the second difference value is 1 in this embodiment, the first waiting time is 4 seconds and the second waiting time is 2 seconds.

In this case, the second waiting time of the second EM node 15b is longer than the third waiting time of the third EM node 15c. The second EM node 15b further receives the third route message 106 from the third EM node 15c and, after the second waiting time, broadcasts the third route message 106 (i.e., broadcasts the second route message 104 and the third route message 106 simultaneously). The first EM node 15a further receives the third route message 106 from the second EM node 15b and, after the first waiting time, broadcasts the third route message 106 (i.e., broadcasts the first route message 102, the second route message 104 and the third route message 106 simultaneously).

Then, the concentrator 13 receives the first route message 102, the second route message 104 and the third route message 106 from the first EM node 15a. Thus, the route paths between the first EM node 15a, the second EM node 15b, the third EM node 15c and the concentrator 13 have been established, and message transmissions can be carried out between the back-end server 11 and the first EM node 15a, the second EM node 15b as well as the third EM node 15c via the concentrator 13.

Furthermore, the third EM node 15c further determines whether the third difference value is equal to zero so as to determine whether the third EM node 15c itself is an EM node of a last layer. In this embodiment, because the total layer number is equal to 3, the third difference value is equal to zero. In this case, the third EM node 15c only broadcasts the third route message 106 but not routes messages received from other EM nodes. However, if the third difference value is unequal to zero in other embodiments, then after receiving the route messages from the other EM nodes, the third EM node 15c also broadcasts the route messages of the other EM nodes after the third waiting time.

Figure 3:
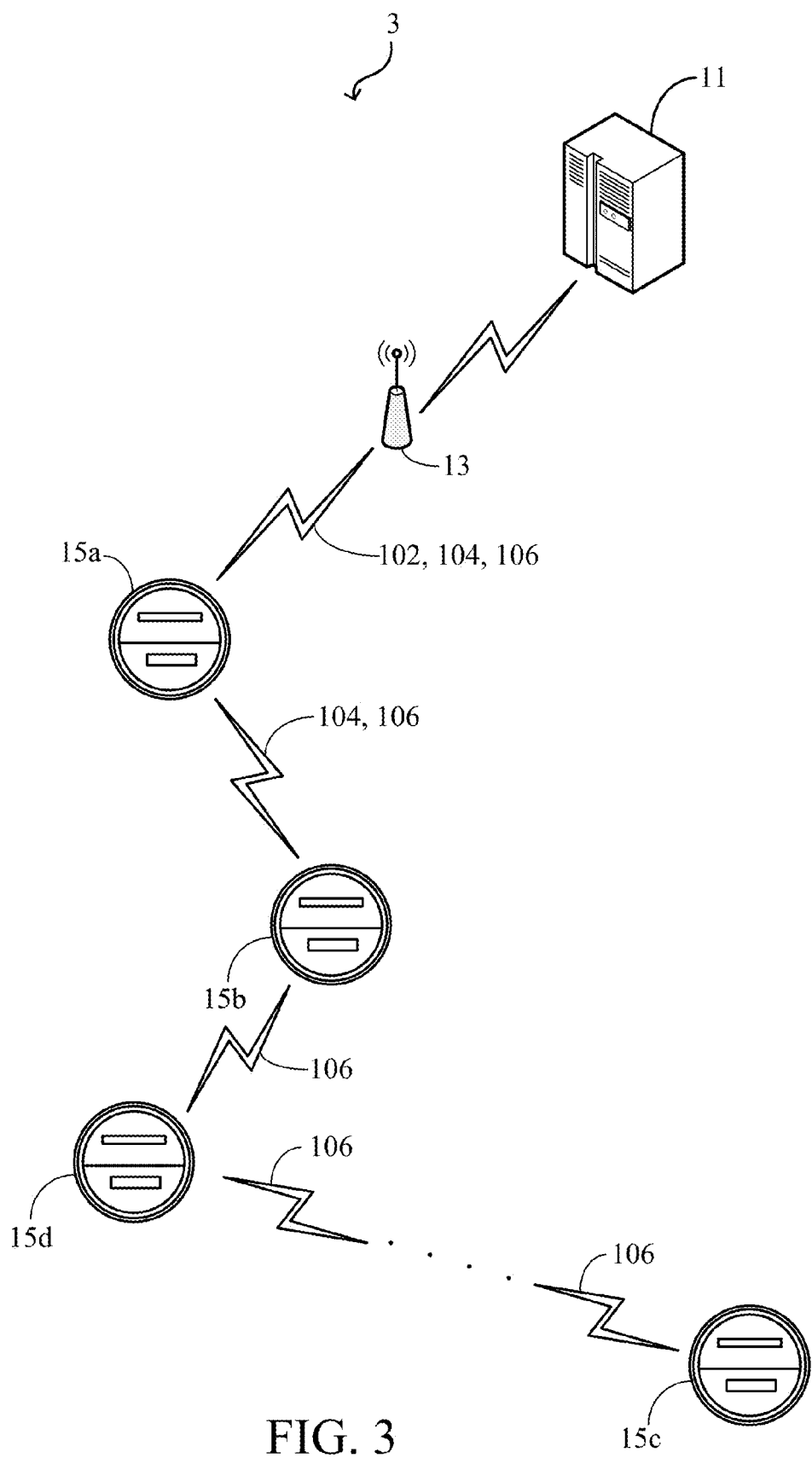
FIG. 3 is a schematic view of an EM network system 3 according to a third embodiment of the present invention.

A third embodiment of the present invention is as shown in FIG. 3, which is a schematic view of an EM network system 3. Different from the EM network system 1 of the first embodiment, the EM network system 3 of the third embodiment further comprises a third EM node 15c and a middle EM node 15d. The third EM node 15c and the middle EM node 15d are electrically connected to the same power supply loop. The third EM node 15c stores a third layer number (e.g., 8) and the total layer number (e.g., 8).

When the power supply loop recovers from the power disconnect condition to the power supplying condition, the third EM node 15c obtains a third waiting time according to a third difference value (e.g., 0) between the third layer number and the total layer number and broadcasts a third route message 106 after the third waiting time. If the third waiting time is equal to the third difference value multiplied by the time interval (e.g., 2 seconds), then the third waiting time is 0 second. Furthermore, the first difference value is 7 and the second difference value is 6 in this embodiment, so the first waiting time is 14 seconds and the second waiting time is 12 seconds.

In this embodiment, the second waiting time is longer than the third waiting time. The second EM node 15b further receives the third route message 106 from the middle EM node 15d and, after the second waiting time, broadcasts the third route message 106 (i.e., broadcasts the second route message 104 and the third route message 106 simultaneously). The first EM node 15a further receives the third route message 106 from the second EM node 15b and, after the first waiting time, broadcasts the third route message 106 (i.e., broadcasts the first route message 102, the second route message 104 and the third route message 106 simultaneously).

It shall be appreciated that, the middle EM node 15d is one of a plurality of nodes disposed between the second EM node 15b and the third EM node 15c, and the second EM node 15b can receive the route message from the middle EM node 15d directly. The EM nodes (including the middle EM node 15d) between the second EM node 15b and the third EM node 15c all store their respective layer numbers and the total layer number, obtain waiting times according to difference values between the respective layer numbers and the total layer number and, after the waiting times, broadcast their respective route messages and the route messages (not shown) received from the other EM nodes. The operations of the EM nodes between the second EM node 15b and the third EM node 15c can be readily known by those of ordinary skill in the art according to the above descriptions and, thus, will not be further described herein.

Then, the concentrator 13 receives the first route message 102, the second route message 104, the third route message 106, and the route messages of the other EM nodes in this branch from the first EM node 15a. Thus, the route paths between all the EM nodes in the branch and the concentrator 13 have been established, and message transmissions can be carried out between the back-end server 11 and all the EM nodes in the branch via the concentrator 13.

Furthermore, as described previously, (a difference value between the layer number of an EM node and the total layer number) mod (a modular divisor)×(a time interval) may be used as a waiting time of the EM node in the present invention. In this case, the first waiting time is equal to the first difference value mod a modular divisor and then multiplied by the time interval, the second waiting time is equal to the second difference value mod the modular divisor and then multiplied by the time interval, and the third waiting time is equal to the third difference value mod the modular divisor and then multiplied by the time interval. Take the modular divisor which is equal to 2 as an example. If the third difference value is an odd number, then the third waiting time is equal to the first waiting time; and if the third difference value is an even number, then the third waiting time is equal to the second waiting time.

On the other hand, each of the EM nodes of the present invention may further store a piece of sub-EM node information. The sub-EM node information contains identification (ID) codes of sub-EM nodes in the branch that have layer numbers larger than the layer number of the current EM node itself. The route messages of the EM nodes comprise ID codes of the respective EM nodes, so after determining that the route messages of the sub-EM nodes in the branch have been received according to the sub-EM node information, the EM nodes can immediately broadcast their respective route messages and the received route messages of all the sub-EM nodes.

Take the EM network system 1 of FIG. 1 as an example. If the first EM node 15a only has the second EM node 15b as the sub-EM node thereof, then a piece of sub-EM node information stored in the first EM node 15a comprises an ID code of the second EM node; and according to the sub-EM node information, the first EM node 15a determines that the second route message 104 has been received so as to broadcast the first route message 102 and the second route message 104 immediately rather than after the first waiting time.

Further, take the EM network system 2 of FIG. 2 as an example. If the second EM node 15b only has the third EM node 15c as the sub-EM node thereof, then a piece of sub-EM node information stored in the second EM node 15b comprises an ID code of the third EM node; and according to the sub-EM node information, the second EM node 15b determines that the third route message 106 has been received so as to broadcast the second route message 104 and the third route message 106 immediately rather than after the second waiting time.

Similarly, if the first EM node 15a only has the second EM node 15b and the third EM node 15c as the sub-EM nodes thereof, then a piece of sub-EM node information stored in the first EM node 15a comprises an ID code of the second EM node and an ID code of the third EM node; and according to the sub-EM node information, the first EM node 15a determines that the second route message 104 and the third route message 106 have been received so as to broadcast the first route message 102, the second route message 104 and the third route message 106 immediately rather than after the first waiting time.

Further, take the EM network system 3 of FIG. 3 as an example. If the second EM node 15b only has the third EM node 15c and at least one middle EM node (including the middle EM node 15d) between the second EM node 15b and the third EM node 15c as the sub-EM nodes thereof, then a piece of sub-EM node information stored in the second EM node 15b comprises an ID code of the third EM node 15c and an ID code of the at least one middle EM node; and according to the sub-EM node information, the second EM node 15b determines that the third route message 106 and the route message of the at least one middle EM node have been received so as to broadcast the second route message 104, the third route message 106 and the route message of the at least one middle EM node immediately rather than after the second waiting time.

Similarly, if the first EM node 15a only has the second EM node 15b, the third EM node 15c and at least one middle EM node (including the middle EM node 15d) between the second EM node 15b and the third EM node 15c as the sub-EM nodes thereof, then a piece of sub-EM node information stored in the first EM node 15a comprises an ID code of the second EM node 15b, an ID code of the third EM node 15c and an ID code of the at least one middle EM node. According to the sub-EM node information, the first EM node 15a further determines that the second route message 104, the third route message 106 and the route message of the at least one middle EM node have been received so as to broadcast the first route message 102, the second route message 104, the third route message 106 and the route message of the at least one middle EM node immediately rather than after the first waiting time.

Figure 4:
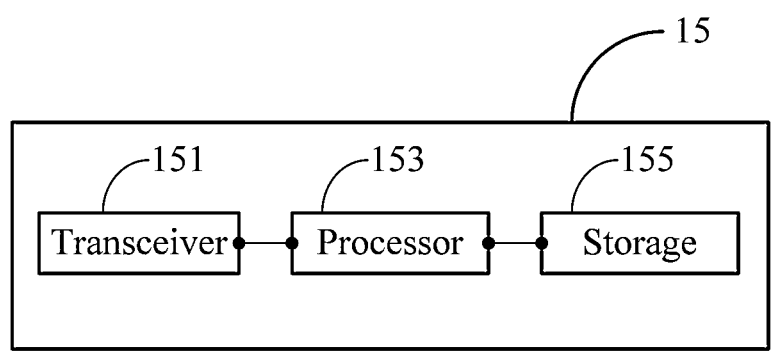
FIG. 4 is a schematic view of an EM node 15 according to a fourth embodiment of the present invention.

A fourth embodiment of the present invention is as shown in FIG. 4, which is a schematic view of an EM node 15. The EM node 15 is connected to a power supply loop, and may be any one of the first EM node 15a, the second EM node 15b, the third EM node 15c and the middle EM node 15d of the aforesaid embodiments. The EM node 15 comprises a transceiver 151, a processor 153 and a storage 155. The storage 155 stores a layer number and a total layer number.

The processor 153 is electrically connected to the transceiver 151 and the storage 155. When the power supply loop recovers from a power disconnect condition to a power supplying condition, the processor 153 obtains a waiting time according to a difference value between the layer number and the total layer number, and enables the transceiver 151 to broadcast a route message after the waiting time. As in the aforesaid embodiments, the waiting time may be equal to the difference value multiplied by a time interval, or equal to the difference value mod a modular divisor and then multiplied by a time interval.

As an example, if the EM node 15 is the first EM node 15a of the EM network system 1, then the layer number is equal to the first layer number, the waiting time is equal to the first waiting time and the route message is the first route message 102. In this case, the transceiver 151 further receives a sub-route message (e.g., the second route message 104) from a sub-EM node (e.g., the second EM node 15b), and broadcasts the sub-route message after the waiting time.

As another example, if the EM node 15 is the first EM node 15a of the EM network system 2, then the layer number is equal to the first layer number, the waiting time is equal to the first waiting time and the route message is the first route message 102. In this case, the transceiver 151 further receives two sub-route messages (e.g., the second route message 104 and the third route message 106) from a sub-EM node (e.g., the second EM node 15b), and broadcasts the two sub-route messages after the waiting time.

As a further example, if the EM node 15 is the third EM node 15c of the EM network system 2, then the layer number is equal to the third layer number, the waiting time is equal to the third waiting time and the route message is the third route message 106. In this case, the processor 153 further determines that the difference value is equal to zero so as to enable the transceiver 151 to broadcast the route message of the EM node 15 itself but not to broadcast route messages received from other EM nodes.

As yet another example, if the EM node 15 is the second EM node 15b of the EM network system 3, then the layer number is equal to the second layer number, the waiting time is equal to the second waiting time and the route message is the second route message 104. In this case, the storage 155 further stores a piece of sub-EM node information, which comprises an ID code of the third EM node 15*c* and ID codes of a plurality of middle nodes. According to the sub-EM node information, the processor 153 further determines that the sub-route messages of the sub-EM nodes (i.e., the third route message 106 of the third EM node 15*c* and the route message of the at least one middle EM node) have been received so as to broadcast the route message and the sub-route messages of the sub-EM nodes (i.e., the second route message 104, the third route message 106 and the route message of the at least one middle node) immediately rather than after the second waiting time.

In addition to the aforesaid descriptions, the EM node 15 of this embodiment can also execute all the operations of the EM nodes set forth in the first embodiment, the second embodiment and the third embodiment and have all the corresponding functions. How the EM node 15 of this embodiment executes these operations and has these functions can be readily appreciated by those of ordinary skill in the art based on the explanation of the first embodiment, the second embodiment and the third embodiment, and thus will not be further described herein.

Figure 5:
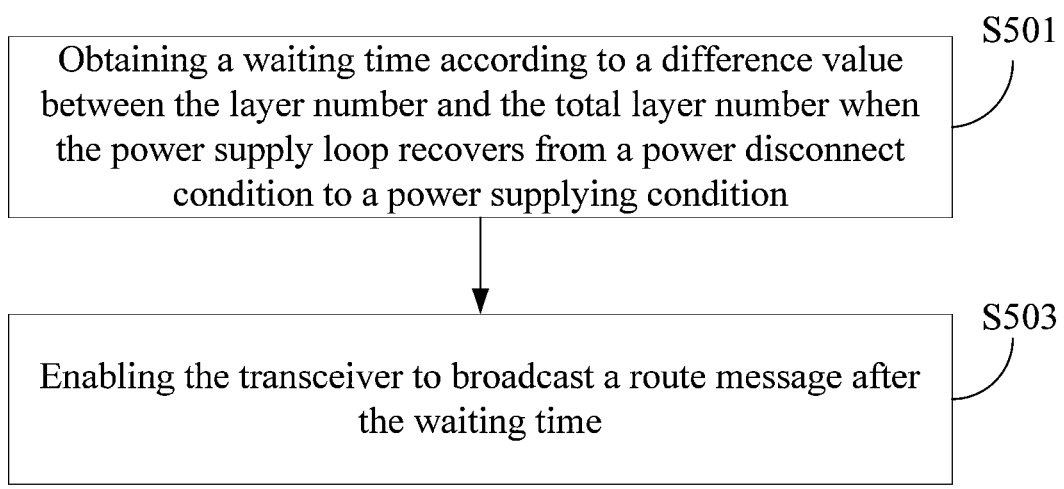
FIG. 5 is a flowchart diagram of a broadcasting method according to a fifth embodiment of the present invention.

A fifth embodiment of the present invention is as shown in FIG. 5, which is a flowchart diagram of a broadcasting method. The broadcasting method of this embodiment can be used in an EM node (e.g., the EM node 15 of the fourth embodiment). The EM node is connected to a power supply loop, and comprises a transceiver, a storage and a processor electrically connected to the transceiver and the storage. The storage stores a layer number and a total layer number. The broadcasting method of this embodiment is executed by the processor of the EM node.

Firstly, step S501 is executed to obtain a waiting time according to a difference value between the layer number and the total layer number when the power supply loop recovers from a power disconnect condition to a power supplying condition. Subsequently, step S503 is executed to enable the transceiver to broadcast a route message after the waiting time. As described previously, the waiting time may be equal to the difference value multiplied by a time interval, or equal to the difference value mod a modular divisor and then multiplied by a time interval. Furthermore, in other embodiments, the step S501 may further comprise a step of determining whether the difference value is equal to zero. If the difference value is equal to zero, then the transceiver only broadcasts the route message of the EM node itself but not broadcasts route messages received from other EM nodes.

In addition to the aforesaid steps, the broadcasting method of this embodiment can also execute all the operations set forth in the fourth embodiment and have all the corresponding functions. How the broadcasting method of this embodiment executes these operations and has these functions can be readily appreciated by those of ordinary skill in the art based on the explanation of the fourth embodiment, and thus will not be further described herein.

Figure 6:
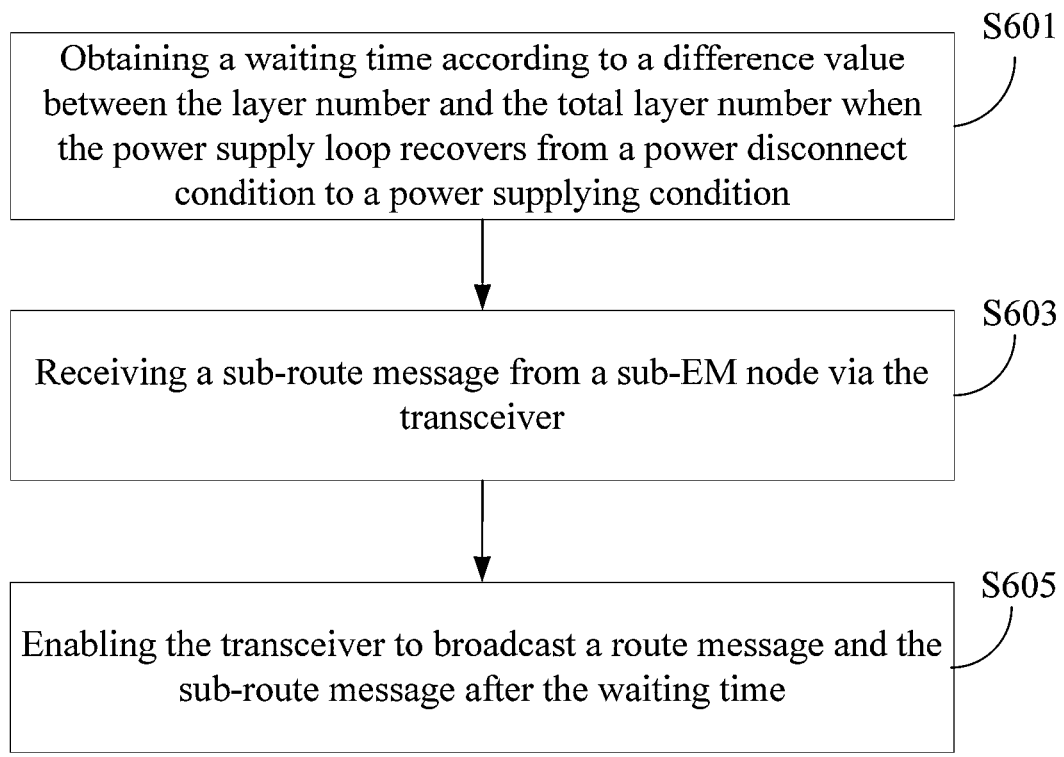
FIG. 6 is a flowchart diagram of a broadcasting method according to a sixth embodiment of the present invention.

A sixth embodiment of the present invention is as shown in FIG. 6, which is a flowchart diagram of a broadcasting method. The broadcasting method of this embodiment can be used in an EM node (e.g., the EM node 15 of the fourth embodiment). The EM node is connected to a power supply loop, and comprises a transceiver, a storage and a processor electrically connected to the transceiver and the storage. The storage stores a layer number and a total layer number. The broadcasting method of this embodiment is executed by the processor of the EM node.

Firstly, step S601 is executed to obtain a waiting time according to a difference value between the layer number and the total layer number when the power supply loop recovers from a power disconnect condition to a power supplying condition. Subsequently, step S603 is executed to receive a sub-route message from a sub-EM node via the transceiver. Then, step S605 is executed to enable the transceiver to broadcast a route message and the sub-route message after the waiting time. Similarly, the waiting time may be equal to the difference value multiplied by a time interval, or equal to the difference value mod a modular divisor and then multiplied by a time interval.

In addition to the aforesaid steps, the broadcasting method of this embodiment can also execute all the operations set forth in the fourth embodiment and have all the corresponding functions. How the broadcasting method of this embodiment executes these operations and has these functions can be readily appreciated by those of ordinary skill in the art based on the explanation of the fourth embodiment, and thus will not be further described herein.

Figure 7:
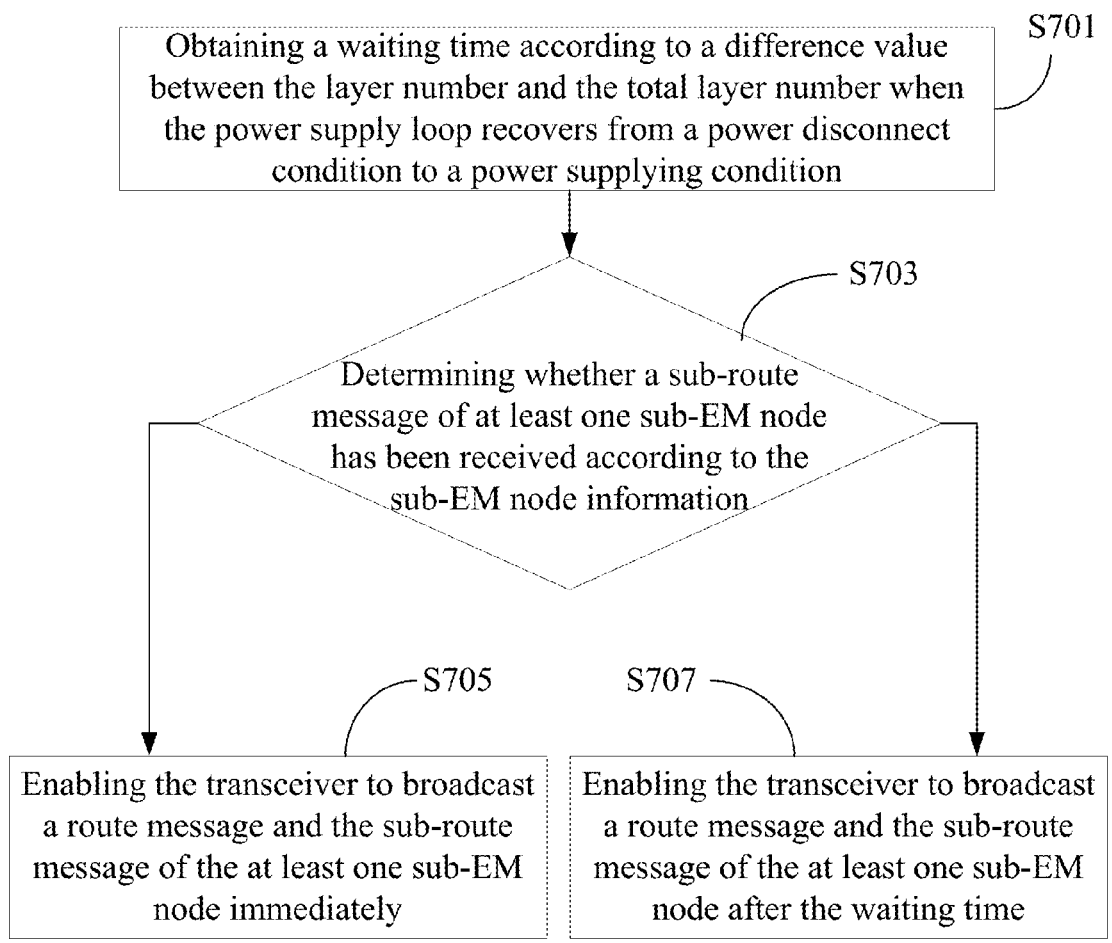
FIG. 7 is a flowchart diagram of a broadcasting method according to a seventh embodiment of the present invention.

A seventh embodiment of the present invention is as shown in FIG. 7, which is a flowchart diagram of a broadcasting method. The broadcasting method of this embodiment can be used in an EM node (e.g., the EM node 15 of the fourth embodiment). The EM node is connected to a power supply loop, and comprises a transceiver, a storage and a processor electrically connected to the transceiver and the storage. The storage stores a layer number, a total layer number and a piece of sub-EM node information. The broadcasting method of this embodiment is executed by the processor of the EM node.

Firstly, step S701 is executed to obtain a waiting time according to a difference value between the layer number and the total layer number when the power supply loop recovers from a power disconnect condition to a power supplying condition. Subsequently, step S703 is executed to determine whether a sub-route message of at least one sub-EM node has been received according to the sub-EM node information. If the answer is "yes", then step S705 is executed to enable the transceiver to broadcast a route message and the sub-route message of the at least one sub-EM node immediately. Otherwise, step S707 is executed to enable the transceiver to broadcast a route message and the sub-route message of the at least one sub-EM node after the waiting time. Similarly, the waiting time may be equal to the difference value multiplied by a time interval, or equal to the difference value mod a modular divisor and then multiplied by a time interval.

In addition to the aforesaid steps, the broadcasting method of this embodiment can also execute all the operations set forth in the fourth embodiment and have all the corresponding functions. How the broadcasting method of this embodiment executes these operations and has these functions can be readily appreciated by those of ordinary skill in the art based on the explanation of the fourth embodiment, and thus will not be further described herein.

According to the above descriptions, the present invention provides an EM network system, an EM node and a broadcasting method thereof. The EM network system of the present invention provides a mechanism of broadcasting route messages according to the AODV routing protocol. By means of route paths established previously, EM nodes in the EM network system store layer numbers of the EM nodes in the respective route paths and a total layer number of the overall route paths. When a power supply loop recovers from a power disconnect condition to a power supplying condition, the EM nodes can obtain different waiting times according to the layer numbers thereof and the total layer number, and broadcast route messages at different time points based on the waiting times to re-establish data transmission paths. Thus, the mechanism of broadcasting route messages of the present invention can effectively reduce collisions of the route messages and network congestions caused during re-establishment of the data transmission paths.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended

What is claimed is:

1. An electric meter (EM) network system, comprising:
   a back-end server;
   a concentrator communicatively connected to the back-end server;
   a first EM node electrically connected to a power supply loop, being configured to store a first layer number and a total layer number, wherein when the power supply loop recovers from a power disconnect condition to a power supplying condition, the first EM node obtains a first waiting time according to a first difference value between the first layer number and the total layer number and broadcasts a first route message after the first waiting time; and
   a second EM node electrically connected to the power supply loop, being configured to store a second layer number and the total layer number, wherein when the power supply loop recovers from the power disconnect condition to the power supplying condition, the second EM node obtains a second waiting time according to a second difference value between the second layer number and the total layer number and broadcasts a second route message after the second waiting time;
   wherein the first waiting time is longer than the second waiting time, the first EM node receives the second route message from the second EM node and broadcasts the second route message after the first waiting time, and the concentrator receives the first route message and the second route message from the first EM node.

2. The EM network system as claimed in claim 1, wherein the first waiting time is equal to the first difference value multiplied by a time interval, and the second waiting time is equal to the second difference value multiplied by the time interval.

3. The EM network system as claimed in claim 1, further comprising a third EM node electrically connected to the power supply loop and configured to store a third layer number and the total layer number, wherein:
   when the power supply loop recovers from the power disconnect condition to the power supplying condition, the third EM node obtains a third waiting time according to a third difference value between the third layer number and the total layer number and broadcasts a third route message after the third waiting time;
   the second waiting time is longer than the third waiting time;
   the second EM node further receives the third route message from the third EM node and broadcasts the third route message after the second waiting time;
   the first EM node further receives the third route message from the second EM node and broadcasts the third route message after the first waiting time; and
   the concentrator further receives the third route message from the first EM node.

4. The EM network system as claimed in claim 3, wherein the third EM node further determines that the third difference value is equal to zero so as to only broadcast the third route message.

5. The EM network system as claimed in claim 1, further comprising: a third EM node electrically connected to the power supply loop and configured to store a third layer number and the total layer number; and a middle EM node electrically connected to the power supply loop, wherein:
   when the power supply loop recovers from the power disconnect condition to the power supplying condition, the third EM node obtains a third waiting time according to a third difference value between the third layer number and the total layer number and broadcasts a third route message after the third waiting time;
   the second EM node further receives the third route message from the middle EM node and broadcasts the third route message after the second waiting time;
   the first EM node further receives the third route message from the second EM node and broadcasts the third route message after the first waiting time; and
   the concentrator further receives the third route message from the first EM node.

6. The EM network system as claimed in claim 5, wherein the third waiting time is equal to the first waiting time, the first waiting time is equal to the first difference value mod a modular divisor and then multiplied by a time interval, the second waiting time is equal to the second difference value mod the modular divisor and then multiplied by the time interval, and the third waiting time is equal to the third difference value mod the modular divisor and then multiplied by the time interval.

7. The EM network system as claimed in claim 5, wherein the third waiting time is equal to the second waiting time, the first waiting time is equal to the first difference value mod a modular divisor and then multiplied by a time interval, the second waiting time is equal to the second difference value mod the modular divisor and then multiplied by the time interval, and the third waiting time is equal to the third difference value mod the modular divisor and then multiplied by the time interval.

8. The EM network system as claimed in claim 5, wherein the third EM node further determines that the third difference value is equal to zero so as to only broadcast the third route message.

9. The EM network system as claimed in claim 1, wherein the first EM node further stores a piece of sub-EM node information, and according to the sub-EM node information, determines that the second route message and a route message of at least one sub-EM node have been received so as to immediately broadcast the first route message, the second route message and the route message of the at least one sub-EM node.

10. The EM network system as claimed in claim 1, wherein the second EM node further stores a piece of sub-EM node information, and according to the sub-EM node information, determines that a route message of at least one sub-EM node has been received so as to immediately broadcast the second route message and the route message of the at least one sub-EM node.

11. An EM node electrically connected to a power supply loop, comprising:
    a storage, being configured to store a layer number and a total layer number;
    a transceiver, being configured to broadcast a route message; and a processor electrically connected to the transceiver and the storage, being configured to obtain a waiting time according to a difference value between the layer number and the total layer number when the power supply loop recovers from a power disconnect condition to a power supplying condition, and enable the transceiver to broadcast the route message after the waiting time.

12. The EM node as claimed in claim 11, wherein the waiting time is equal to the difference value multiplied by a time interval.

13. The EM node as claimed in claim 11, wherein the waiting time is equal to the difference value mod a modular divisor and then multiplied by a time interval.

14. The EM node as claimed in claim 11, wherein the processor further determines that the difference value is equal to zero so as to enable the transceiver to only broadcast the route message.

15. The EM node as claimed in claim 11, wherein the transceiver further receives at least one sub-route message from a sub-EM node, and broadcasts the at least one sub-route message after the waiting time.

16. The EM node as claimed in claim 11, wherein the storage further stores a piece of sub-EM node information, and according to the sub-EM node information, the processor further determines that a sub-route message of at least one sub-EM node has been received so as to immediately broadcast the route message and the sub-route message of the at least one sub-EM node.

17. A broadcasting method for an EM node, the EM node being electrically connected to a power supply loop and comprising a storage, a transceiver and a processor, the processor being electrically connected to the storage and the transceiver, the storage being configured to store a layer number and a total layer number, and the broadcasting method being executed by the processor and comprising the following steps of:

obtaining a waiting time according to a difference value between the layer number and the total layer number when the power supply loop recovers from a power disconnect condition to a power supplying condition; and enabling the transceiver to broadcast a route message after the waiting time.

18. The broadcasting method as claimed in claim 17, wherein the waiting time is equal to the difference value multiplied by a time interval.

19. The broadcasting method as claimed in claim 17, wherein the waiting time is equal to the difference value mod a modular divisor and then multiplied by a time interval.

20. The broadcasting method as claimed in claim 17, further comprising the following step of:

determining that the difference value is zero so as to enable the transceiver to only broadcast the route message.

21. The broadcasting method as claimed in claim 17, comprising the following steps of:

receiving at least one sub-route message from a sub-EM node via the transceiver; and broadcasting the at least one sub-route message after the waiting time.

22. The broadcasting method as claimed in claim 17, wherein the storage further stores a piece of sub-EM node information, the broadcasting method further comprising the following steps of:

determining that a sub-route message of at least one sub-EM node has been received according to the sub-EM node information; and broadcasting the route message and the sub-route message of the at least one sub-EM node immediately.

* * * * *